US010834746B2

United States Patent
Gao et al.

(10) Patent No.: US 10,834,746 B2
(45) Date of Patent: Nov. 10, 2020

(54) CARRIER SCHEDULING METHOD, DEVICE AND SYSTEM FOR CARRIER AGGREGATION

(71) Applicant: ZTE CORPORATION, Guangdong (CN)

(72) Inventors: Minggang Gao, Shenzhen (CN); Qingyu Ni, Shenzhen (CN); Jie Meng, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 46 days.

(21) Appl. No.: 16/095,180

(22) PCT Filed: Jun. 22, 2016

(86) PCT No.: PCT/CN2016/086777
§ 371 (c)(1),
(2) Date: Oct. 19, 2018

(87) PCT Pub. No.: WO2017/181516
PCT Pub. Date: Oct. 26, 2017

(65) Prior Publication Data
US 2019/0150178 A1    May 16, 2019

(30) Foreign Application Priority Data
Apr. 20, 2016    (CN) .......................... 2016 1 0250228

(51) Int. Cl.
*H04W 72/12*    (2009.01)
*H04L 5/00*    (2006.01)
(Continued)

(52) U.S. Cl.
CPC ....... *H04W 72/1273* (2013.01); *H04L 5/0091* (2013.01); *H04W 28/0289* (2013.01);
(Continued)

(58) Field of Classification Search
None
See application file for complete search history.

(56) References Cited

U.S. PATENT DOCUMENTS 8,433,251 B2* 4/2013 Chen ................. H04L 5/0053
455/68
8,494,454 B2* 7/2013 McBeath ........... H04L 5/0005
455/68
(Continued)

FOREIGN PATENT DOCUMENTS

CN    101772179 A    7/2010
CN    101848483 A    9/2010
(Continued)

OTHER PUBLICATIONS

International Search Report for International Appl. No. PCT/CN2016/086777, dated Jan. 25, 2017.
(Continued)

*Primary Examiner* — Michael J Moore, Jr.
(74) *Attorney, Agent, or Firm* — Foley & Lardner LLP (57) ABSTRACT

Disclosed is a carrier scheduling method, device and system for carrier aggregation. The method may include: within a current transmission time interval (TTI), when the number of times of overlapping between search spaces of all user equipment (UEs) to be scheduled satisfies a preset determination condition, selecting a UE-specific downlink control information (DCI) format; marking the selected UE-specific DCI format, and setting scheduling of a physical downlink shared channel (PDSCH) corresponding to the UE-specific DCI format onto an anchor carrier component; setting physical downlink control channels (PDCCHs) corresponding to remaining DCI formats other than the UE-specific DCI format onto carrier components for scheduling the PDSCHs corresponding to the remaining DCI formats; and
(Continued)

sending the set anchor carrier component and the carrier components set corresponding to the remaining DCI formats to the UEs to be scheduled.

20 Claims, 4 Drawing Sheets

(51) Int. Cl.
*H04W 28/02* (2009.01)
*H04W 72/04* (2009.01)

(52) U.S. Cl.
CPC ......... *H04W 72/042* (2013.01); *H04W 72/12* (2013.01); *H04L 5/001* (2013.01)

(56) References Cited

U.S. PATENT DOCUMENTS

| | | | | |
|---|---|---|---|---|
| 9,306,723 | B2* | 4/2016 | Nory | H04L 5/0007 |
| 10,548,127 | B2* | 1/2020 | Yang | H04L 5/0094 |
| 10,708,027 | B2* | 7/2020 | Yi | H04W 76/27 |
| 2010/0254329 | A1* | 10/2010 | Pan | H04L 5/001 |
| | | | | 370/329 |
| 2010/0279628 | A1* | 11/2010 | Love | H04L 5/003 |
| | | | | 455/70 |
| 2012/0033627 | A1* | 2/2012 | Li | H04L 5/0007 |
| | | | | 370/329 |
| 2013/0010724 | A1* | 1/2013 | Han | H04L 5/0007 |
| | | | | 370/329 |
| 2013/0016672 | A1* | 1/2013 | Yang | H04L 1/0046 |
| | | | | 370/329 |
| 2013/0028108 | A1* | 1/2013 | Wu | H04L 5/001 |
| | | | | 370/252 |
| 2013/0044713 | A1 | 2/2013 | Suh et al. | |
| 2013/0058240 | A1 | 3/2013 | Kim et al. | |
| 2013/0088973 | A1* | 4/2013 | Yang | H04L 5/003 |
| | | | | 370/241 |
| 2014/0307693 | A1* | 10/2014 | Feng | H04L 27/362 |
| | | | | 370/329 |
| 2014/0376457 | A1* | 12/2014 | Feng | H04J 11/0079 |
| | | | | 370/329 |
| 2019/0281590 | A1* | 9/2019 | Pan | H04W 52/146 |

FOREIGN PATENT DOCUMENTS

| | | |
|---|---|---|
| CN | 102123524 A | 7/2011 |
| CN | 103918337 A | 7/2014 |
| WO | WO-2011/019009 A1 | 2/2011 |

OTHER PUBLICATIONS

Extended European Search Report for EP Appl. No. 16899103.2, dated Sep. 30, 2019.
Panasonic: "Handling of overlapping common search space and UE-specific search space for cross carrier scheduling", 3GPP Draft; RI-102018, 3rd Generation Partnership Project (3GPP), Mobile Competence Centre; 650, Route Des Lucioles; F-06921 Sophia-Antipolis Cedex; France, vol. RAN WGI, no. Beijing, China; Apr. 12, 2010, Apr. 6, 2010 (Apr. 6, 2010), XP050419351, [retrieved on Apr. 6, 2010].

\* cited by examiner

CARRIER SCHEDULING METHOD, DEVICE AND SYSTEM FOR CARRIER AGGREGATION

CROSS-REFERENCE TO RELATED APPLICATIONS

This is a National Stage Application, filed under 35 U.S.C. 371, of International Patent Application No. PCT/CN2016/086777, filed on Jun. 22, 2016, which claims priority to Chinese patent application No. 201610250228.5 filed on Apr. 20, 2016, contents of both of which are incorporated herein by reference in their entireties.

TECHNICAL FIELD

The present disclosure relates to wireless communication technology and, in particular, to a carrier scheduling method, device and system for carrier aggregation (CA).

BACKGROUND

The CA technology is a core technology of the Long Term Evolution Advanced technology (LTE-Advanced). When user equipment (UE) is provided with carrier aggregation, the UE monitors the search space of all activated serving cells on each non-discontinuous reception (non-DRX) subframe. The search space includes a common search space and one or more UE-specific search spaces.

The search space $S_k^{(L)}$ on the aggregation level $L \in \{1, 2, 4, 8\}$ is defined as a set of physical downlink control channels (PDCCHs) candidates. The channel control elements (CCE) occupied by one PDCCH candidate m in the search space $S_k^{(L)}$ of each serving cell is as shown in formula (1):

$$L\{(Y_k + m') \bmod \lfloor N_{CCE,k}/L \rfloor\} + i \quad (1)$$

where the mathematical symbol $\lfloor \bullet \rfloor$ denotes the operation of rounding down; for the common search space, $m' = m$; and for the UE-specific search space, if the UE sets a carrier indicator field (CIF) on the serving cell which has the PDCCH being monitored by the UE, then $m' = m + M^{(L)} \cdot n_{CI}$ where $n_{CI}$ is a value of the CIF; and if the UE does not set the CIF on the serving cell which has the PDCCH being monitored by the UE, then $m' = m$. It should be noted that $i = 0, \ldots, L-1$ and $m = 0, \ldots, M^{(L)} - 1$; $M^{(L)}$ is the number of PDCCH candidates to be monitored in a given search space; for the common search space, $Y_k$ is 0; and for the UE-specific search space $S_k^{(L)}$ (aggregation level is L), $Y_k = (A \cdot Y_{k-1}) \bmod D$, where $Y_{-1} = n_{RNTI} \neq 0$, $A = 39827$, $D = 65537$ and $k = \lfloor n_s/2 \rfloor$, where $n_s$ is a time slot number (ranging from 0 to 19) of one system frame. It can be seen that the common search space of one serving cell starts from CCE 0; the starting position of the UE-specific search space of one serving cell may be calculated by the formula (1) with i set to 0.

In addition, in the CA technology, a base station designates a primary carrier component (PCC) to the UE and other carrier components are called secondary carrier components (SCCs); and a serving cell corresponding to the PCC is called a primary cell (Pcell) and a serving cell corresponding to each SCC is called a secondary cell (Scell). The Pcell and Scell form a set of activated serving cells. For a single UE, the common search space exists merely on the Pcell, that is, the UE merely monitors the UE-specific search space on the Scell.

In conjunction with the content of the 3rd Generation Partnership Project (3GPP), it can be known that the search spaces of the UEs of the Pcell and Scell in the LTE-A are respectively as shown in Table 1 and Table 2.

TABLE 1

| Search Space $S_k^{(L)}$ | | | Number of |
|---|---|---|---|
| Type | Aggregation Level L | Size (Occupied CCEs) | PDCCH Candidates $M^{(L)}$ |
| UE-specific Search Space | 1 | 6 | 6 |
|  | 2 | 12 | 6 |
|  | 4 | 8 | 2 |
|  | 8 | 16 | 2 |
| Common Search Space | 4 | 16 | 4 |
|  | 8 | 16 | 2 |

TABLE 2

| Search Space $S_k^{(L)}$ | | | Number of |
|---|---|---|---|
| Type | Aggregation Level L | Size (Occupied CCEs) | PDCCH Candidates |
| UE-specific Search Space | 1 | 6 | 6 |
|  | 2 | 12 | 6 |
|  | 4 | 8 | 2 |
|  | 8 | 16 | 2 |

It can be seen from Table 1 and Table 2 that the number of times of PDCCH blind detection performed by the UE on the Pcell is 44, and the number of times of PDCCH blind detection performed on an activated Scell is 32. The inventor has found that in a CA terminal of the LTE-Advanced, when a large number of activated Scells exist, the number of times of PDCCH blind detection increases sharply as the number of Scells rises. Since the search space of the UE is determined by both the starting position CCE_start of the search space calculated by the formula (1) and the aggregation level L, in the process of using the cross-carrier scheduling with the CIF, when a large number of carriers are scheduled, PDCCH resource congestion and the UE search space collision are prone to occur in a large probability, thereby reducing the success rate of blind detection and affecting the performance of carrier scheduling.

The above content provides the background information that is related to the present disclosure and that is not necessarily prior art.

SUMMARY

Embodiments of the present disclosure provide a carrier scheduling method, device and system for CA, which may reduce the occurrence of conflict and congestion in case of a large number of scheduled carriers, thereby improving the success rate of blind detection and the performance of carrier scheduling.

In a first aspect, an embodiment of the present disclosure provides a carrier scheduling method for carrier aggregation (CA), which is applied to a network side and includes:

within a transmission time interval (TTI), when the number of times of overlapping between search spaces of UEs to be scheduled satisfies a preset determination condition, selecting a UE-specific downlink control information (DCI) format from multiple DCI formats;

marking the selected UE-specific DCI format, and setting scheduling of a physical downlink shared channel (PDSCH) corresponding to the UE-specific DCI format onto an anchor carrier component;

setting physical downlink control channels (PDCCHs) corresponding to remaining DCI formats other than the UE-specific DCI format onto carrier components for scheduling PDSCHs corresponding to the remaining DCI formats; and sending the set anchor carrier component and carrier components set corresponding to the remaining DCI formats to the UEs to be scheduled.

In one or more embodiments, the step of marking the selected UE-specific DCI format includes:

setting a carrier indicator field (CIF) of the UE-specific DCI format to an invalid value.

In one or more embodiments, the number of times of overlapping between the search spaces of the UEs to be scheduled satisfies the preset determination condition when a ratio of the number of times of overlapping between the search spaces of the UEs to be scheduled to a total number of DCIs exceeds a preset threshold.

In one or more embodiments, the UE-specific DCI format includes a DCI format 0, a DCI format 1A or a DCI format 2A.

In one or more embodiments, the remaining DCI formats do not support cross-carrier scheduling, and a CIF of each of the remaining DCI formats is removed.

In one or more embodiments, the method further includes:

sending, by the network side, a query instruction message to UEs served by the network side;

receiving, by the network side, a query response message returned from all each of the UEs served by the network side, where the query response message includes capability support indication information corresponding to the each of the UEs served by the network side; and determining, by the network side, the UEs to be scheduled from the UEs served by the network side according to the capability support indication information in the query response message.

In a second aspect, an embodiment of the present disclosure provides a carrier scheduling method for carrier aggregation (CA), which is applied to a user equipment (UE) and includes:

within a transmission time interval (TTI), detecting a preset DCI format from a received anchor carrier component;

when a preset mark is detected in the preset DCI format, acquiring a PDSCH corresponding to the preset DCI format on the anchor carrier component; and detect PDCCHs of received remaining carrier components other than the anchor carrier component, acquire remaining DCI formats other than the preset DCI format, and performing decoding according to the remaining DCI formats to acquire PDSCHs corresponding to the remaining DCI formats.

In one or more embodiments, the step of detecting PDCCHs of received remaining carrier components other than the anchor carrier component and acquiring remaining DCI formats other than the preset DCI format may include:

performing a blind detection on the remaining carrier components by using a payload size parameter including no CIF, and acquiring the remaining DCI formats in the remaining carrier components.

In one or more embodiments, the method further includes:

receiving a query instruction message sent by a network side; and sending a query response message to the network side, where the query response message includes capability support indication information of the UE.

In a third aspect, an embodiment of the present disclosure provides a network side device, including: a selection unit, a setting unit and a first sending unit.

The selection unit is configured to, within a transmission time interval (TTI), when the number of times of overlapping between search spaces of UEs to be scheduled satisfies a preset determination condition, select a UE-specific downlink control information (DCI) format from multiple DCI formats.

The setting unit is configured to mark the selected UE-specific DCI format, and set scheduling of a physical downlink shared channel (PDSCH) corresponding to the UE-specific DCI format onto an anchor carrier component; and set physical downlink control channels (PDCCHs) corresponding to remaining DCI formats other than the UE-specific DCI format onto carrier components for scheduling PDSCHs corresponding to the remaining DCI formats; and The first sending unit is configured to send the set anchor carrier component and carrier components set corresponding to the remaining DCI formats to the UEs to be scheduled.

In one or more embodiments, the setting unit may be configured to set a carrier indicator field (CIF) of the UE-specific DCI format to an invalid value.

In one or more embodiments, the number of times of overlapping between the search spaces of the UEs to be scheduled satisfies the preset determination condition when a ratio of the number of times of overlapping between the search spaces of the UEs to be scheduled to a total number of DCIs exceeds a preset threshold.

In one or more embodiments, the UE-specific DCI format may include a DCI format 0, a DCI format 1A or a DCI format 2A.

In one or more embodiments, the remaining DCI formats do not support cross-carrier scheduling, and a CIF of each of the remaining DCI formats is removed.

In one or more embodiments, the first sending unit is configured to send a query instruction message to UEs served by the network side device; and the selection unit is further configured to receive a query response message returned from each of the UEs served by the network side device, where the query response message includes capability support indication information corresponding to the each of the UEs served by the network side device; and determine the UEs to be scheduled from the UEs served by the network side device according to the capability support indication information in the query response message.

In a fourth aspect, an embodiment of the present disclosure provides a user equipment (UE), including a detection unit and an acquisition unit.

The detection unit is configured to, within a current transmission time interval (TTI), detect a preset DCI format from a received anchor carrier component.

The acquisition unit is configured to, when a preset mark is detected in the preset DCI format, acquire a PDSCH corresponding to the preset DCI format on the anchor carrier component.

The PDCCHs of received remaining carrier components other than the anchor carrier component are received, remaining DCI formats other than the preset DCI format are acquired, and decoding is performed according to the remaining DCI formats to acquire PDSCHs corresponding to the remaining DCI formats.

In one or more embodiments, the acquisition unit is configured to perform a blind detection on the remaining carrier components by using a payload size parameter including no CIF, and acquire the remaining DCI formats in the remaining carrier components.

In one or more embodiments, the UE further includes: a receiving unit and a second sending unit.

The receiving unit is configured to receive a query instruction message sent by a network side.

The second sending unit is configured to send a query response message to the network side, where the query response message includes capability support indication information of the UE.

In a fifth aspect, an embodiment of the present disclosure provides a carrier scheduling system for carrier aggregation, including a network side device and a user equipment (UE).

The network side device is configured to:
within a transmission time interval (TTI), when the number of times of overlapping between search spaces of UEs to be scheduled satisfies a preset determination condition, select a UE-specific downlink control information (DCI) format from multiple DCI formats;
mark the selected UE-specific DCI format, and set scheduling of a physical downlink shared channel (PDSCH) corresponding to the UE-specific DCI format onto an anchor carrier component;
set physical downlink control channels (PDCCHs) corresponding to remaining DCI formats other than the UE-specific DCI format onto carrier components for scheduling PDSCHs corresponding to the remaining DCI formats; and
send the set anchor carrier component and carrier components set corresponding to the remaining DCI formats to the UEs to be scheduled.

The UE is configured to:
within the TTI, detect a preset DCI format from a received anchor carrier component;
when a preset mark is detected in the preset DCI format, acquire a PDSCH corresponding to the preset DCI format on the anchor carrier component; and
detect the PDCCHs of received remaining carrier components other than the anchor carrier component, acquire the remaining DCI formats other than the preset DCI format, and perform decoding according to the remaining DCI formats to acquire the PDSCHs corresponding to the remaining DCI formats.

An embodiment of the present disclosure further provides a computer memory medium configured to store computer-executable instructions for executing any carrier scheduling method for carrier aggregation (CA) applied to the network side or any carrier scheduling method for carrier aggregation (CA) applied to the UE.

The embodiments of the present disclosure provide a carrier scheduling method, device and system for CA. When the degree of the PDCCH conflict and congestion generated by the cross-carrier scheduling is high, a non-cross-carrier scheduling method is temporarily adopted within the current transmission time interval (TTI), so that when a large number of carriers are scheduled, the occurrence of conflict and congestion is reduced, thereby improving the success rate of blind detection and the performance of carrier scheduling.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in any improper way. In the accompanying drawings.

DETAILED DESCRIPTION

Figure 1:
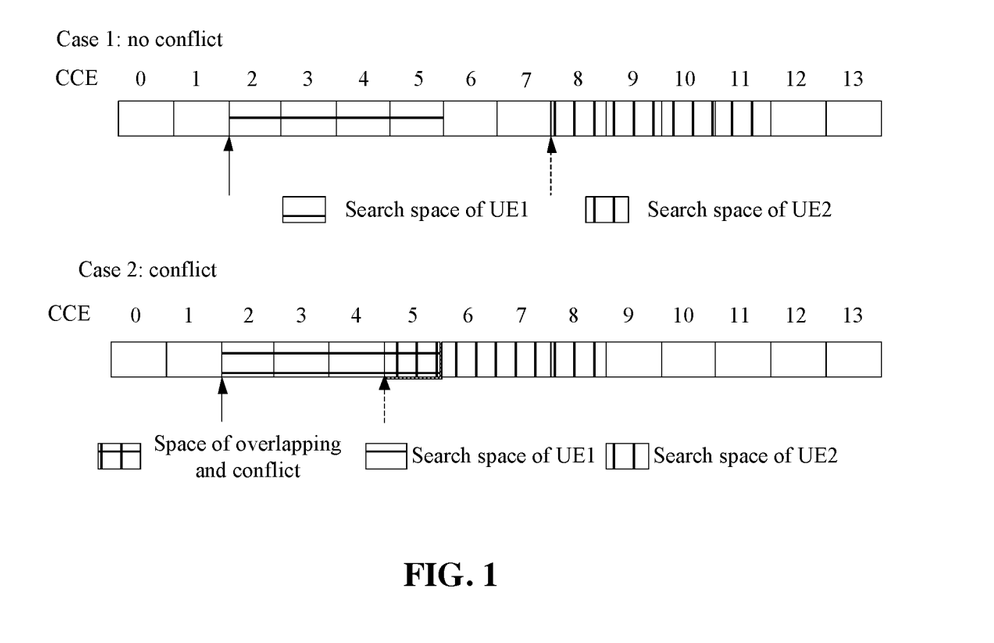
FIG. 1 is a schematic diagram illustrating an interrelation between PDCCH search spaces according to an embodiment of the present disclosure.

In conjunction with the fact mentioned in the background that the search space of the UE is determined by both the CCE_Start calculated by the formula (1) and the aggregation level L, FIG. 1 shows an interrelation between PDCCH search spaces when two UEs perform cross-carrier scheduling. In FIG. 1, the solid arrow indicates the start position CCE_Start of the search space of UE1, and the dotted arrow indicates the start position CCE_Start of the search space of UE2.

It can be seen that in the process of cross-carrier scheduling with CIF, when a large number of carriers are scheduled, a conflict shown in case B occurs. In case B, an overlapping shown by the part filled with crosses in case B exists between the search spaces of the UE1 and UE2. Therefore, the PDCCH resource congestion and the UE search space collision and conflict are prone to occur in a large probability.

In the embodiments of the present disclosure, the network side counts within the current TTI the overlapping conflicts of the search spaces of terminals. When the statistical result exceeds a preset conflict threshold, non-cross-carrier scheduling is adaptively adopted, reducing the possible congestion within the current TTI.

Embodiment 1

Figure 2:
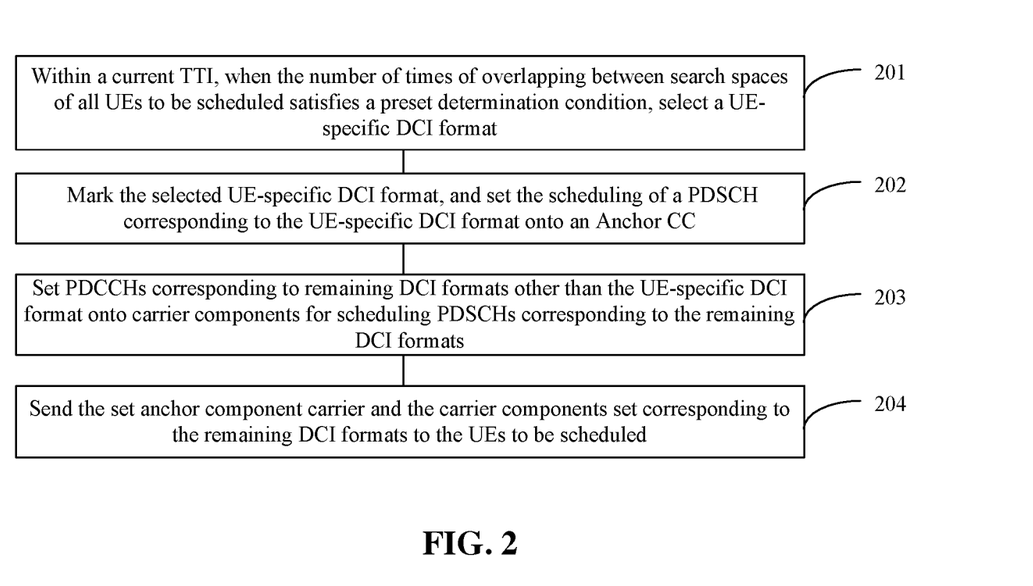
FIG. 2 is a flowchart 1 of a carrier scheduling method for CA according to an embodiment of the present disclosure.

FIG. 2 shows a carrier scheduling method for CA provided by an embodiment of the present disclosure. The method is applied to a network side and may include the steps described below.

In step S201, within a current TTI, when the number of times of overlapping between search spaces of all UEs to be scheduled satisfies a preset determination condition, a UE-specific downlink control information (DCI) format is selected.

It can be understood that the number of times of overlapping between search spaces of all UEs to be scheduled may be acquired according to the range of search spaces of all UEs to be scheduled. It should be noted that in the implementation process, when search spaces of two UEs overlap, one time of overlapping is recorded; and the total number of times of overlapping between search spaces of any two UEs in all UEs to be scheduled is used as the number of times of overlapping between search spaces of all UEs to be scheduled.

In one or more embodiments, the number of times of overlapping between search spaces of all UEs to be scheduled may satisfies the preset determination condition when a ratio of the number of times of overlapping between search spaces of all UEs to be scheduled to the total number of DCIs exceeds a preset threshold. The total number of DCIs refers to a sum of DCI formats used for respective UEs. In a case where a DCI format is used for more than one UE, this DCI format is counted repeatedly.

In the implementation process, considering the DCI format 0/1A/2A is the most frequently scheduled DCI format by the network side, in this embodiment, the selected UE-specific DCI format in the UE-specific search space is the DCI format 0/1A/2A.

In step S202, the selected UE-specific DCI format is marked, and the scheduling of a physical downlink shared channel (PDSCH) corresponding to the UE-specific DCI format is set onto an anchor carrier component (Anchor CC).

It should be noted that the step in which the selected UE-specific DCI format is marked may include that a carrier indicator field (CIF) of the UE-specific DCI format is set to an invalid value. For example, the invalid value may be set to a value corresponding to no carrier component index.

In step S203, PDCCHs corresponding to remaining DCI formats other than the UE-specific DCI format are set onto carrier components for scheduling PDSCHs corresponding to the remaining DCI formats.

It should be noted that, in this step, the remaining DCI formats in this step may be configured to remove the CIF and not to support cross-carrier scheduling, so as to reduce the occurrent of conflict and congestion on the basis of the function of blind detection conflict and congestion of the non-cross-carrier scheduling.

In step S204, the set anchor carrier component and the carrier components set corresponding to the remaining DCI formats are sent to the UEs to be scheduled.

It can be understood that steps from S201 to S205 are completed within the current TTI, and when a next TTI starts, the method enters step S201 to perform the corresponding processing in the next TTI, which is not repeated in this embodiment.

It should be noted that before step S201, search spaces of all UEs to be scheduled needs to be acquired, that is, in step S200, within the current TTI, the downlink channel control information (DCI) of each UE to be scheduled and search spaces corresponding to each aggregation level are acquired.

In one or more embodiments, in the implementation process, the step in which the DCI of each UE to be scheduled and the search spaces corresponding to each aggregation level may include that the search spaces corresponding to each UE to be scheduled and each aggregation level according to the DCI of each UE to be scheduled and the formula (1).

It should be further noted that the UE to be scheduled in this embodiment may be considered as UE capable of implementing the method of the embodiment of the present disclosure. Therefore, before step S200, the network side may further test whether the UE has the capability to implement the method of the embodiment of the present disclosure. The implementation process of testing may include the steps described below.

The network side sends a query instruction message to all UEs served by the network side currently.

The network side receives a query response message returned from each of all UEs served by the network side currently. The query response message includes capability support indication information corresponding to the UE. In one or more embodiments, the capability support indication information is configured to indicate whether the corresponding UE has the capability to implement the method of the embodiment of the present disclosure.

The network side determines the UEs to be scheduled from all UEs served by the network side currently according to the capability support indication information in the query response message.

The embodiment provides a carrier scheduling method for CA, which is applied to a network side. The network side counts within the current TTI the overlapping conflicts of the search spaces of terminals. When the statistical result exceeds a preset conflict threshold, non-cross-carrier scheduling is adaptively adopted, so as to reduce the possible congestion within the current TTI.

Embodiment 2

Figure 3:
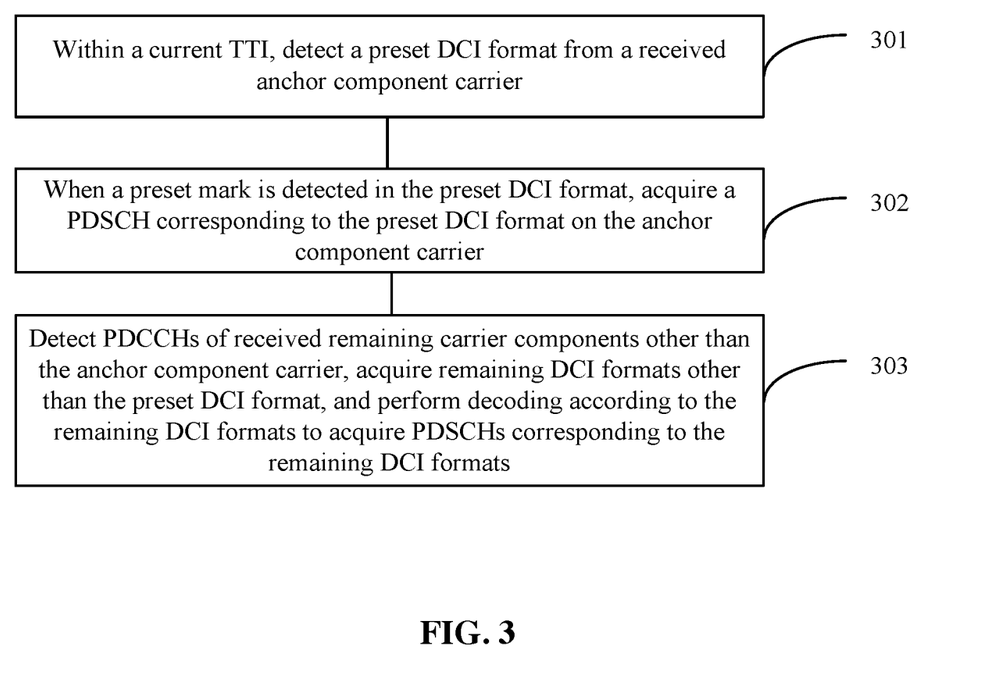
FIG. 3 is a flowchart 2 of a carrier scheduling method for CA according to an embodiment of the present disclosure.

FIG. 3 shows a carrier scheduling method for CA provided by an embodiment of the present disclosure. The method is applied to UE and may include the steps described below.

In step S301, within a current TTI, a preset DCI format is detected from a received anchor carrier component.

In step S302, when a preset mark is detected in the preset DCI format, a PDSCH corresponding to the preset DCI format is acquired on the anchor carrier component.

In step S303, PDCCHs of received remaining carrier components other than the anchor carrier component are detected, remaining DCI formats other than the preset DCI format are acquired, and decoding is performed according to the remaining DCI formats to acquire PDSCHs corresponding to the remaining DCI formats.

In the implementation process, the received carrier components are sent by the network side and may include the anchor carrier component and the remaining carrier components other than the anchor carrier component.

The step in which a preset mark is detected in the preset DCI format may include that a CIF of the preset DCI format is detected to be an invalid value.

In one or more embodiments, the step in which the PDCCHs of received remaining carrier components other than the anchor carrier component are detected and the remaining DCI formats other than the preset DCI format are acquired may include:

a blind detection is performed on the remaining carrier components by using a payload size parameter without any CIF, and the remaining DCI formats in the remaining carrier components are acquired.

In one or more embodiments, the UE in this embodiment may also be a UE capable of implementing the method of the embodiment of the present disclosure. Therefore, before step S301, the method further includes the steps described below.

A query instruction message sent by a network side is received.

A query response message is sent to the network side, where the query response message includes capability support indication information of the UE.

The embodiment provides a carrier scheduling method for CA, which is applied to a terminal side. When the degree of the PDCCH conflict and congestion generated by the cross-carrier scheduling is high, a non-cross-carrier scheduling method is temporarily adopted within the current TTI, so that when a large number of carriers are scheduled, the occurrence of conflict and congestion is reduced, thereby improving the success rate of blind detection and the performance of carrier scheduling.

Embodiment 3

Figure 4:
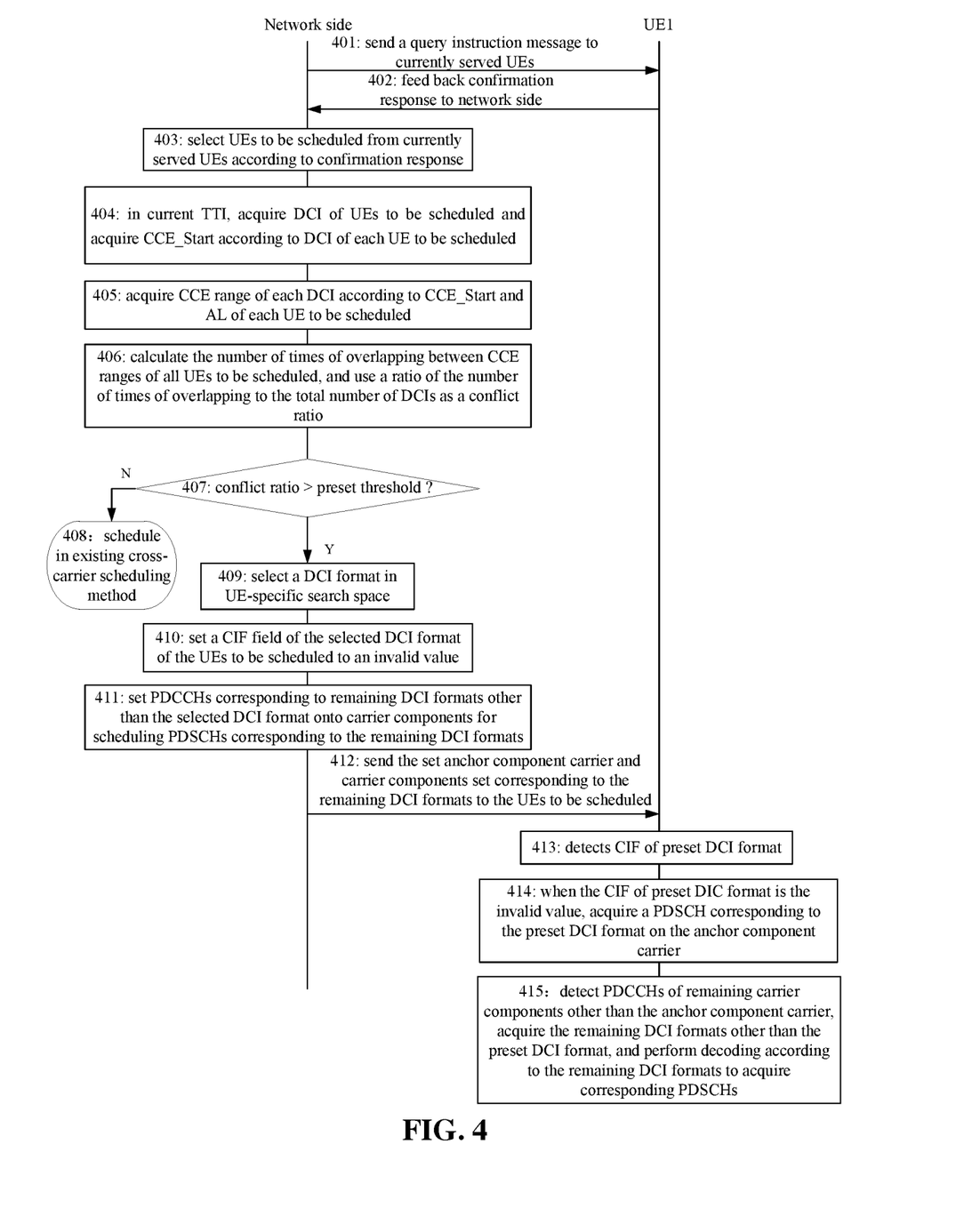
FIG. 4 is a flowchart 3 of a carrier scheduling method for CA according to an embodiment of the present disclosure.

FIG. 4 shows a carrier scheduling method for CA provided by an embodiment of the present disclosure. The method may include the steps described below.

In step S401, a network side sends a query instruction message to all UEs served by the network side currently.

It can be understood that the query instruction message enables a terminal to report its own capability to support the method of the embodiment of the present disclosure.

In step S402, a UE sends a query response message to the network side.

In the implementation process of this embodiment, the UE sends feedback with respect to the query instruction message according to the capability of the UE; the query response message may include capability support indication information of the UE. In one or more embodiments, the capability support indication information is configured to indicate whether the corresponding UE has the capability to implement the method of the embodiment of the present disclosure.

In step S403, the network side determines UEs to be scheduled from all UEs served by the network side currently according to the capability support indication information in the query response message.

In step S403, within a current TTI, the network side acquires DCIs of all UEs to be scheduled and acquires a corresponding CCE_Start according to the DCI of each UE to be scheduled.

In step S405, the network side acquires the CCE range occupied by each DCI according to the CCE_Start and the aggregation level of each UE to be scheduled.

In step S406, the network side calculates the number of times of overlapping between the CCE ranges of all UEs to be scheduled, and uses a ratio of the number of times of overlapping to the total number of DCIs as a conflict ratio.

It can be understood that in conjunction with case B in FIG. 1, when the CCE ranges of the two UEs overlap, the PDCCH resource congestion and the UE search space collision occur, thereby reducing the success rate of blind detection and affecting the performance of carrier scheduling. In this step, when the CCE ranges of any two UEs in all UEs to be scheduled overlap, one time of overlapping is recorded; and the total number of times of overlapping between CCE ranges of any two UEs in all UEs to be scheduled is used as the number of times of overlapping between CCE ranges of all UEs to be scheduled.

In step S407, the network side compares the conflict ratio with a preset threshold.

It should be noted that, when the conflict ratio does not exceed the preset threshold, the overlapping between the CCE ranges of the UEs is not serious at this time, and the method goes to step S408 in which scheduling is performed according to an existing cross-carrier scheduling method (that is, scheduling information of the remaining carrier components is sent on a specified carrier component); and when the conflict ratio exceeds the preset threshold, the overlapping between the CCE ranges of the UEs is serious at this time, and the method goes to step S409 in which a DCI format in the UE-specific search space is selected.

It should be noted that since the DCI format 0/1A/2A is the most frequently scheduled DCI format by the network side, in this embodiment, the DCI format 0/1A/2A is taken as example of the selected UE-specific DCI format.

In step S410, the network side sets a CIF field of the selected DCI format of the UEs to be scheduled to an invalid value.

The CIFs corresponding to three CCs are respectively set to 0(000), 1(001) and 2(010); and the values in parentheses are the binary numbers corresponding to the CC indexes. The invalid value may be set to a value corresponding to no carrier component index. For example, the CIF in the DCI format 0/1A/2A is set to 3(011) or a value greater than 3. Therefore, the PDSCH corresponding to the DCI format 0/1A/2A is still placed on the Anchor CC corresponding to the Pcell.

In step S411, the network side sets PDCCHs corresponding to remaining DCI formats other than the selected DCI format onto carrier components for scheduling PDSCHs corresponding to the remaining DCI formats.

According to the above embodiments, the implementation process of this step may be as follows. The CIF is removed from the remaining DCI formats other than the DCI format 0/1A/2A, and the scheduling is performed in a non-cross-carrier scheduling method. That is, the scheduling is performed according to a rule of placing the PDCCHs on the CCs for scheduling the PDSCHs. For example, the PDCCH for the PDSCH of CC2 is no longer placed on CC1, but placed on CC2; and the PDCCH for the PDSCH of CC3 is no longer placed on CC1, but placed on CC3.

In step S412, the network side sends the set anchor carrier component and carrier components set corresponding to the remaining DCI formats to the UEs to be scheduled.

The embodiment of the present disclosure will be described by taking the UE1 as an example. It can be understood that the UE1 has the capability to support the method of the embodiment of the present disclosure.

In step S413, the UE1 detects the CIF of a preset DCI format.

It should be noted that the preset DCI format described in step S413 is the selected DCI format described in step S409 and S410. According to above embodiment, the preset DCI format is the DCI format 0/1A.

In step S414, when the CIF of the preset DIC format is the invalid value, the UE1 acquires a PDSCH corresponding to the preset DCI format on the anchor carrier component.

In conjunction with the above embodiment, when the CIF in the DCI format 0/1A is set to 3 (011) or a value greater than 3, the UE1 interprets the DCI format 0/1A as the scheduling of the Pcell corresponding to the anchor carrier component, and acquires a PDSCH of the DCI format 0/1A on the Pcell according to a resource allocation indication.

In step S415, the UE1 detects PDCCHs of remaining carrier components other than the anchor carrier component, acquires the remaining DCI formats other than the preset DCI format, and performs decoding according to the remaining DCI formats to acquire corresponding PDSCHs.

In one or more embodiments, for the remaining DCI formats, the UE1 uses a payload size field without any CIF to blindly detect remaining DCI formats of CC1, CC2 and CC3.

It can be understood that the UE1 decodes the PDSCHs according to all acquired DCI information so as to acquire all data sent by the network side.

It should be noted that in a next TTI, the method goes to step S404 to perform corresponding processing in the next TTI.

Embodiment 4

Figure 5:
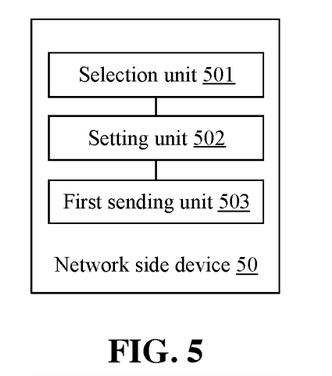
FIG. 5 is a structural diagram of a network side device according to an embodiment of the present disclosure.

FIG. 5 shows a network side device 50 provided by an embodiment of the present disclosure. The device 50 may include: a selection unit 501, a setting unit 502 and a first sending unit 503.

The selection unit 501 is configured to, within a current TTI, when the number of times of overlapping between search spaces of all UEs to be scheduled satisfies a preset determination condition, select a UE-specific DCI format from multiple DCI formats.

The setting unit 502 is configured to mark the selected UE-specific DCI format, and set scheduling of a physical downlink shared channel (PDSCH) corresponding to the UE-specific DCI format at an anchor carrier component; and set physical downlink control channels (PDCCHs) corresponding to remaining DCI formats other than the UE-specific DCI format onto carrier components for scheduling PDSCHs corresponding to the remaining DCI formats.

The first sending unit 503 is configured to send the set anchor carrier component and carrier components set corresponding to the remaining DCI formats to the UEs to be scheduled.

In one or more embodiments, the setting unit may be configured to set a carrier indicator field (CIF) of the UE-specific DCI format to an invalid value.

In one or more embodiments, the number of times of overlapping between the search spaces of all UEs to be scheduled may satisfy the preset determination condition when a ratio of the number of times of overlapping between the search spaces of all UEs to be scheduled to the total number of DCIs exceeds a preset threshold.

In one or more embodiments, the UE-specific DCI format may include a DCI format 0, a DCI format 1A or a DCI format 2A.

In one or more embodiments, the remaining DCI formats do not support cross-carrier scheduling, and a CIF of each of the remaining DCI formats is removed.

In one or more embodiments, the first sending unit 503 may send a query instruction message to all UEs served by the network side device currently; and the selection unit 501 is further configured to receive a query response message returned from each UE served by the network side device currently, where the query response message includes capability support indication information corresponding to the UEs served by the network side device currently; and determine the UEs to be scheduled from all UEs served by the network side currently according to the capability support indication information in the query response message. In a network side device 50 provided by the embodiment of the present disclosure, the network side counts within the current TTI the overlapping conflicts of the search spaces of terminals. When the statistical result exceeds a preset conflict threshold, non-cross-carrier scheduling is adaptively adopted, so as to reduce the possible congestion within the current TTI.

Embodiment 5

Figure 6:
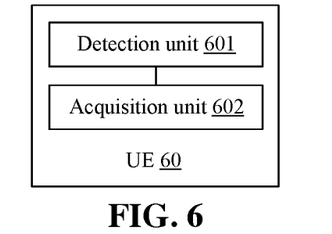
FIG. 6 is a structural diagram 1 of a UE according to an embodiment of the present disclosure.

FIG. 6 shows a structure of a UE 60 provided by an embodiment of the present disclosure. The UE 60 may include a detection unit 601 and an acquisition unit 602.

The detection unit 601 is configured to, within a current TTI, detect a preset DCI format from a received anchor carrier component.

The acquisition unit 602 is configured to, when a preset mark is detected in the preset DCI format, acquire a PDSCH corresponding to the preset DCI format on the anchor carrier component.

The PDCCHs of received remaining carrier components other than the anchor carrier component is received, remaining DCI formats other than the preset DCI format are acquired, and decoding is performed according to the remaining DCI formats to acquire PDSCHs corresponding to the remaining DCI formats.

In one or more embodiments, the acquisition unit 602 is configured to perform a blind detection on the remaining carrier components by using a payload size parameter without any CIF, and acquire the remaining DCI formats in the remaining carrier components.

Figure 7:
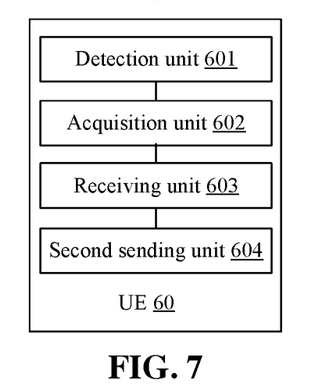
FIG. 7 is a structural diagram 2 of a UE according to an embodiment of the present disclosure.

In one or more embodiments, with reference to FIG. 7, the UE 60 further includes: a receiving unit 603 and a second sending unit 604.

The receiving unit 603 is configured to receive a query instruction message sent by a network side.

The second sending unit 604 is configured to send a query response message to the network side, where the query response message includes capability support indication information of the UE.

Embodiment 6

Figure 8:
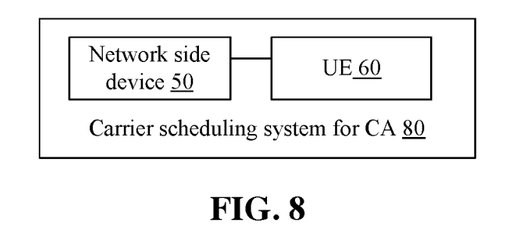
FIG. 8 is a structural diagram of a carrier scheduling system for CA according to an embodiment of the present disclosure.

FIG. 8 shows a carrier scheduling system for carrier aggregation 80 provided by an embodiment of the present disclosure. The system 80 includes a network side device 50 and a user equipment (UE) 60.

The network side device 50 is configured to:
within a current TTI, when a number of times of overlapping between search spaces of all UEs to be scheduled satisfies a preset determination condition, select a UE-specific downlink control information (DCI) format from multiple DCI formats;
mark the selected UE-specific DCI format, and set scheduling of a physical downlink shared channel (PDSCH) corresponding to the UE-specific DCI format onto an anchor carrier component;
set physical downlink control channels (PDCCHs) corresponding to remaining DCI formats other than the UE-specific DCI format onto carrier components for scheduling PDSCHs corresponding to the remaining DCI formats; and
send the set anchor carrier component and carrier components set corresponding to the remaining DCI formats to the UEs to be scheduled.

The UE 60 is configured to:
within the current TTI, detect a preset DCI format from a received anchor carrier component;
when a preset mark is detected in the preset DCI format, acquire a PDSCH corresponding to the preset DCI format on the anchor carrier component; and
detect PDCCHs of the received remaining carrier components other than the anchor carrier component, acquire the remaining DCI formats other than the preset DCI format, and perform decoding according to the remaining DCI formats to acquire the PDSCHs corresponding to the remaining DCI formats.

The embodiment of the present disclosure provides a carrier scheduling system for CA. When the degree of the PDCCH conflict and congestion generated by the cross-carrier scheduling is high, a non-cross-carrier scheduling method is temporarily adopted within the current TTI, so that when a large number of carriers are scheduled, the occurrence of conflict and congestion is reduced, thereby improving the success rate of blind detection and the performance of carrier scheduling.

It is to be understood by those skilled in the art that the embodiments of the present disclosure may be provided as methods, systems and computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

The present disclosure is described with reference to flowcharts and/or block diagrams of methods, apparatuses (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions can be provided to a processor of a general purpose computer, a special purpose computer, an embedded processor or other programmable data processing apparatus to produce a machine, such that instructions, which are executed via the processor of the computer or other programmable data processing apparatus, create a means for implementing one or more flows in the flowcharts or the functions specified in one or more blocks in the block diagrams.

These computer program instructions may also be stored in a computer-readable memory which can direct a computer or other programmable data processing apparatus to function in a particular manner, such that the instructions stored in the computer-readable memory produce an article of manufacture including instruction means which implement the function specified in one or more flows in the flowcharts and/or one or more blocks in the block diagrams.

These computer program instructions may also be loaded onto a computer or other programmable data processing apparatus to cause a series of operational steps to be executed on the computer or other programmable apparatus to produce a computer implemented process such that the instructions executed on the computer or other programmable apparatus provide steps for implementing one or more flows in the flowcharts and/or the functions specified in one or more blocks in the block diagrams.

INDUSTRIAL APPLICABILITY

According to the carrier scheduling method, device and system for CA provided by the embodiments of the present disclosure, when the degree of the PDCCH conflict and congestion generated by the cross-carrier scheduling is high, a non-cross-carrier scheduling method is temporarily adopted within the current TTI so that when a large number of carriers are scheduled, the occurrence of conflict and congestion is reduced, thereby improving the success rate of blind detection and the performance of carrier scheduling.

What is claimed is:

1. A carrier scheduling method for carrier aggregation (CA), applied to a network side, comprising:
    within a transmission time interval (TTI), when a number of times of overlapping between a plurality of search spaces of a plurality of pieces of user equipment (UE) to be scheduled satisfies a preset determination condition, selecting a UE-specific downlink control information (DCI) format from a plurality of DCI formats;
    marking the selected UE-specific DCI format, and setting scheduling of a physical downlink shared channel (PDSCH) corresponding to the UE-specific DCI format onto an anchor carrier component;
    setting a plurality of physical downlink control channels (PDCCHs) corresponding to remaining DCI formats other than the UE-specific DCI format onto a plurality of carrier components for scheduling PDSCHs corresponding to the remaining DCI formats; and
    sending the set anchor carrier component and the plurality of carrier components set corresponding to the remaining DCI formats to the pieces of UE to be scheduled.

2. The method according to claim 1, wherein the marking the selected UE-specific DCI format comprises:
    setting a carrier indicator field (CIF) of the UE-specific DCI format to an invalid value.

3. The method according to claim 1, wherein the number of times of overlapping between the search spaces of the pieces of UE to be scheduled satisfies the preset determination condition when a ratio of the number of times of overlapping between the search spaces of the pieces of UE to be scheduled to a total number of DCIs exceeds a preset threshold.

4. The method according to claim 1, wherein the UE-specific DCI format comprises a DCI format 0, a DCI format 1A or a DCI format 2A.

5. The method according to claim 1, wherein the remaining DCI formats do not support cross-carrier scheduling, and a CIF of each of the remaining DCI formats is removed.

6. The method according to claim 1, further comprising:
    sending, by the network side, a query instruction message to a plurality of pieces of UE served by the network side;
    receiving, by the network side, a query response message returned from each of the pieces of UE served by the network side, wherein the query response message comprises capability support indication information corresponding to the each of the pieces of UE served by the network side; and
    determining, by the network side, the pieces of UE to be scheduled from the pieces of UE served by the network side according to the capability support indication information in the query response message.

7. A carrier scheduling method for carrier aggregation (CA), applied to user equipment (UE), comprising:
    within a transmission time interval (TTI), detecting a preset downlink control information (DCI) format from a received anchor carrier component;
    when a preset mark is detected in the preset DCI format, acquiring a physical downlink control channel (PDSCH) corresponding to the preset DCI format on the anchor carrier component; and
    detecting a plurality of PDCCHs of received remaining carrier components other than the anchor carrier component, acquiring remaining DCI formats other than the preset DCI format, and performing decoding according to the remaining DCI formats to acquire a plurality of PDSCHs corresponding to the remaining DCI formats.

8. The method according to claim 7, wherein the detecting a plurality of PDCCHs of received remaining received carrier components other than the anchor carrier component and acquiring remaining DCI formats other than the preset DCI format comprises:
    performing a blind detection on the remaining carrier components by using a payload size parameter including no CIF, and acquiring the remaining DCI formats in the remaining carrier components.

9. The method according to claim 7, further comprising:
receiving a query instruction message sent by a network side; and
sending a query response message to the network side, wherein the query response message comprises capability support indication information of the UE.

10. A network side device, comprising:
a processor; and
a memory for storing instructions executable by the processor,
wherein the processor is configured to:
within a transmission time interval (TTI), when a number of times of overlapping between a plurality of search spaces of a plurality of pieces of user equipment (UE) to be scheduled satisfies a preset determination condition, select a UE-specific downlink control information (DCI) format from a plurality of DCI formats;
mark the selected UE-specific DCI format, and set scheduling of a physical downlink shared channel (PDSCH) corresponding to the UE-specific DCI format onto an anchor carrier component, and
set a plurality of physical downlink control channels (PDCCHs) corresponding to remaining DCI formats other than the UE-specific DCI format onto a plurality of carrier components for scheduling PDSCHs corresponding to the remaining DCI formats; and
send the set anchor carrier component and the plurality of carrier components set corresponding to the remaining DCI formats to the pieces of UE to be scheduled.

11. The device according to claim 10, wherein the processor is configured to set a carrier indicator field (CIF) of the UE-specific DCI format to an invalid value.

12. The device according to claim 10, wherein the number of times of overlapping between the search spaces of the pieces of UE to be scheduled satisfies the preset determination condition when a ratio of the number of times of overlapping between the search spaces of the pieces of UE to be scheduled to a total number of DCIs exceeds a preset threshold.

13. The device according to claim 10, wherein the UE-specific DCI format comprises a DCI format 0 format, a DCI format 1A or a DCI format 2A.

14. The device according to claim 10, wherein the remaining DCI formats do not support cross-carrier scheduling, and a CIF of each of the remaining DCI formats is removed.

15. The device according to claim 10, wherein the processor is configured to:
send a query instruction message to a plurality of pieces of UE served by the network side device; and
receive a query response message returned from each of the pieces of UE served by the network side device, wherein the query response message comprises capability support indication information corresponding to the each of the pieces of UE served by the network side device; and
determine the pieces of UE to be scheduled from the pieces of UE served by the network side device according to the capability support indication information in the query response message.

16. A user equipment (UE), comprising:
a processor; and
a memory for storing instructions executable by the processor,
wherein the processor is configured to:
within the current transmission time interval (TTI), detect a preset DCI format from a received anchor carrier component; and
when a preset mark is detected in the preset DCI format, acquire a PDSCH corresponding to the preset DCI format on the anchor carrier component;
wherein a plurality of PDCCHs of received remaining carrier components other than the anchor carrier component is received, remaining DCI formats other than the preset DCI format are acquired, and decoding is performed according to the remaining DCI formats to acquire a plurality of PDSCHs corresponding to the remaining DCI formats.

17. The UE according to claim 16, wherein the processor is configured to perform a blind detection on the remaining carrier components by using a payload size parameter including no CIF, and acquire the remaining DCI formats in the remaining carrier components.

18. The UE according to claim 16, wherein the processor is further configured to:
receive a query instruction message sent by a network side; and
send a query response message to the network side, wherein the query response message comprises capability support indication information of the UE.

19. A non-transitory computer storage medium, which is configured to store computer-executable instructions for executing the method of claim 1.

20. A non-transitory computer storage medium, which is configured to store computer-executable instructions for executing the method of claim 7.

* * * * *